US007741946B2

(12) United States Patent
Ho

(10) Patent No.: US 7,741,946 B2
(45) Date of Patent: Jun. 22, 2010

(54) METAL OXIDE VARISTOR WITH HEAT PROTECTION

(75) Inventor: Chang-Wei Ho, Keelung (TW)

(73) Assignee: Thinking Electronics Industrial Co., Ltd. (TW)

(*) Notice: Subject to any disclaimer, the term of this patent is extended or adjusted under 35 U.S.C. 154(b) by 206 days.

(21) Appl. No.: 11/881,047

(22) Filed: Jul. 25, 2007

(65) Prior Publication Data

US 2009/0027153 A1 Jan. 29, 2009

(51) Int. Cl.
*H02H 1/00* (2006.01)
*H01H 85/04* (2006.01)
*H01C 17/28* (2006.01)

(52) U.S. Cl. .............................. 337/5; 337/6; 337/405; 337/406; 338/21; 338/22 R

(58) Field of Classification Search ..................... 337/5, 337/6, 405, 406; 29/619; 338/21, 22 R
See application file for complete search history.

(56) References Cited

U.S. PATENT DOCUMENTS

| | | | | |
|---|---|---|---|---|
| 3,638,083 | A * | 1/1972 | Dornfeld et al. | 361/321.1 |
| 3,903,494 | A * | 9/1975 | May | 338/20 |
| 4,107,759 | A * | 8/1978 | Shirn et al. | 361/275.4 |
| 4,107,762 | A * | 8/1978 | Shirn et al. | 361/534 |
| 4,212,045 | A * | 7/1980 | Martzloff | 361/127 |
| 4,288,833 | A * | 9/1981 | Howell | 361/124 |
| 4,538,347 | A * | 9/1985 | Palilla et al. | 29/619 |
| 4,975,674 | A * | 12/1990 | Sumiyoshi et al. | 338/21 |
| 5,315,474 | A * | 5/1994 | Kuriyama | 361/534 |
| 5,363,272 | A * | 11/1994 | Tanaka et al. | 361/534 |
| 5,708,553 | A * | 1/1998 | Hung | 361/103 |
| 5,781,394 | A * | 7/1998 | Lorenz et al. | 361/124 |
| 5,901,027 | A * | 5/1999 | Ziegler et al. | 361/124 |
| 5,982,597 | A * | 11/1999 | Webb | 361/103 |
| 6,094,128 | A * | 7/2000 | Bennett et al. | 338/21 |
| 6,204,746 | B1 * | 3/2001 | Kane et al. | 337/32 |
| 6,211,770 | B1 * | 4/2001 | Coyle | 338/21 |
| 6,252,488 | B1 * | 6/2001 | Ziegler et al. | 337/5 |
| 6,307,462 | B2 * | 10/2001 | McLoughlin | 338/21 |
| 6,430,019 | B1 * | 8/2002 | Martenson et al. | 361/124 |
| 6,636,403 | B2 * | 10/2003 | McLoughlin et al. | 361/103 |
| 7,375,943 | B2 * | 5/2008 | Lu | 361/126 |
| 7,453,681 | B2 * | 11/2008 | Ho | 361/127 |
| 7,477,503 | B2 * | 1/2009 | Aszmus | 361/124 |
| 7,483,252 | B2 * | 1/2009 | de Palma et al. | 361/127 |
| 2008/0129440 | A1 * | 6/2008 | Ho | 337/5 |

* cited by examiner

*Primary Examiner*—Anatoly Vortman
(74) *Attorney, Agent, or Firm*—Jackson Walker, LLP

(57) ABSTRACT

A metal oxide varistor with heat protection has a body, an insulated washer, a first lead, a second lead and a thermal fuse. The body has two sides and two contacts respectively on the sides. The insulated washer is attached to one contact and has a through hole. The first lead is mounted on the other contact. The second lead is mounted on the insulated washer. The thermal fuse is mounted on the insulated washer and electrically connects to the second lead and the second contact. When the body overloads and overheats, the thermal fuse causes the circuit to open quickly, and the insulated washer keeps the thermal fuse from electrically connecting to the second contact again.

15 Claims, 13 Drawing Sheets

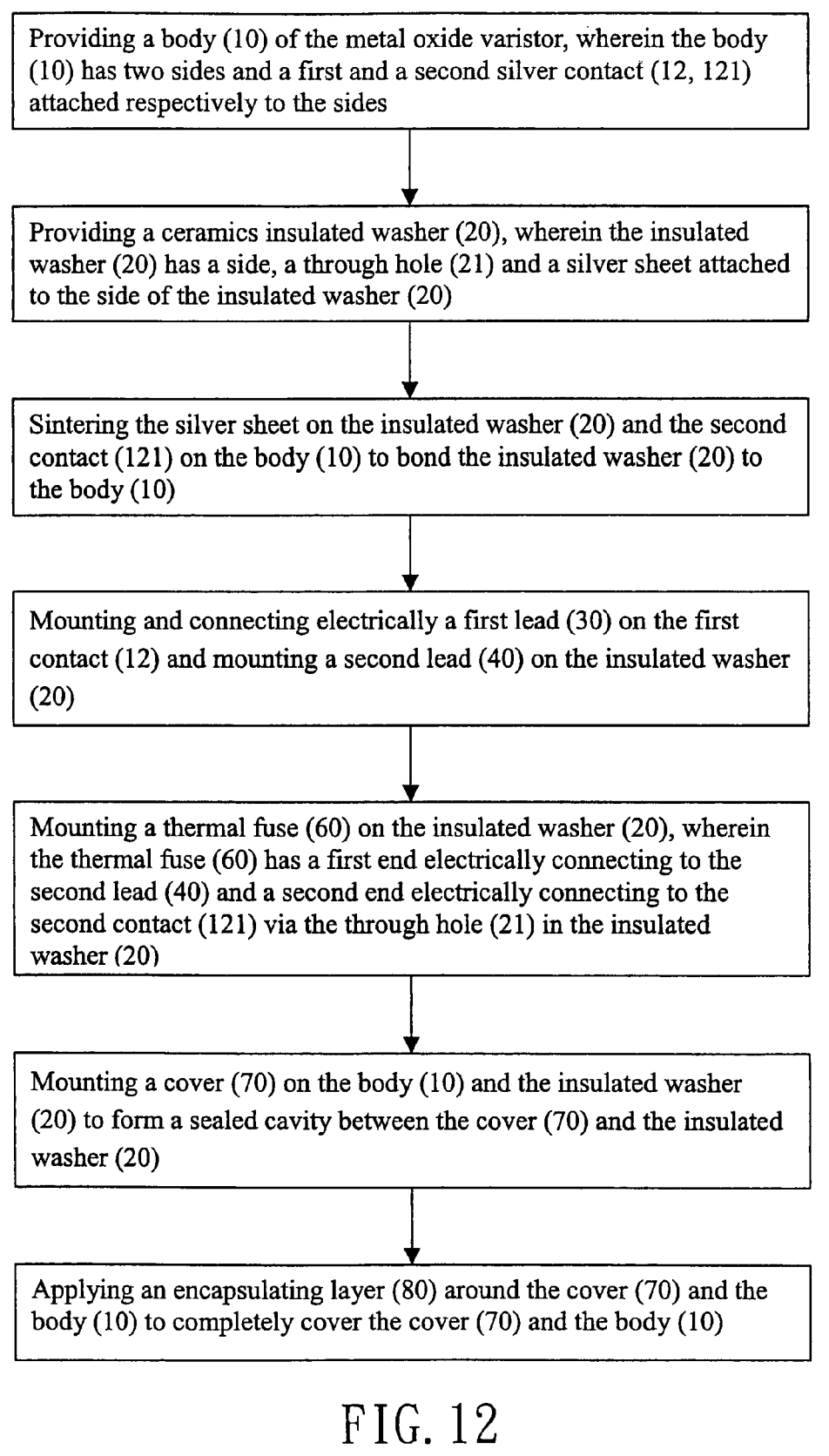

Providing a body (10) of the metal oxide varistor, wherein the body (10) has two sides and a first and a second silver contact (12, 121) attached respectively to the sides

↓

Providing a ceramics insulated washer (20), wherein the insulated washer (20) has a side, a through hole (21) and a silver sheet attached to the side of the insulated washer (20)

↓

Sintering the silver sheet on the insulated washer (20) and the second contact (121) on the body (10) to bond the insulated washer (20) to the body (10)

↓

Mounting and connecting electrically a first lead (30) on the first contact (12) and mounting a second lead (40) on the insulated washer (20)

↓

Mounting a thermal fuse (60) on the insulated washer (20), wherein the thermal fuse (60) has a first end electrically connecting to the second lead (40) and a second end electrically connecting to the second contact (121) via the through hole (21) in the insulated washer (20)

↓

Mounting a cover (70) on the body (10) and the insulated washer (20) to form a sealed cavity between the cover (70) and the insulated washer (20)

↓

Applying an encapsulating layer (80) around the cover (70) and the body (10) to completely cover the cover (70) and the body (10)

FIG. 12

METAL OXIDE VARISTOR WITH HEAT PROTECTION

BACKGROUND OF THE INVENTION

1. Field of the Invention

The present invention is directed to a metal oxide varistor having heat protection, especially to a metal oxide varistor with an automatic switching-off feature that automatically opens a circuit in conditions of overheating due to sustained over-voltages.

2. Description of the Prior Arts

Metal oxide varistors are widely used in circuits as voltage protection elements and inrush-current-absorbing elements. Metal oxide varistors have the capability of clamping high transient voltages appearing on unconditioned power lines to a low level to protect electrical equipment or devices connected to the line. While the metal oxide varistors have a long life and have the ability to repeatedly clamp high transient voltage spikes to a safe level, the metal oxide varistors do eventually fail and ultimately, even if a catastrophic failure does not occur, the impedance of metal oxide varistors decreases to the point where they present a significant load, and eventually overheat and fail while emitting smoke and fumes.

Thus, the protection is generally provided to a metal oxide varistors by connecting the varistors across a power line in series with a current limiting fuse and/or a thermal fuse. If the temperature of the varistor increases beyond the rated temperature of the thermal-fuse, the thermal fuse will open, thereby removing the varistor from the circuit. Thermal-fuses used to protect electrical circuits from varistor failure are generally cylindrical in shape and are mounted on printed circuit boards on which the varistor is mounted with the fuse arranged adjacent and parallel to the varistor body. As long as the thermal protective fuse is physically close enough to the varistor, an increase in varistor temperature will increase the temperature of the thermal protective fuse, causing it to open. While these thermal protective fuses used to protect electrical circuits from varistor failure have been somewhat effective, varistors may overheat and fail if localized overheating occurs at a portion of the varistor body remote from the fuse. The varistor and surrounding areas may be destroyed before the temperature at the fuse increases sufficiently to cause the fuse open.

In a further known prior art device, a conventional metal oxide varistor and a thermal fuse are packaged together in encapsulation material to provide heat protection. However, when the temperature of the varistor increases beyond the thermal fuse's rated temperature and the thermal fuse opens, air in the fuse expands because of the heat, which may cause a spark to be generated as a result of a short circuit. The expanded air and the spark may explode the encapsulating material and the elements of the conventional metal oxide varistor and damage other elements in the circuit. Moreover, the explosion may generate a loud noise and startle anyone in the vicinity of the varistor.

To overcome the shortcomings, the present invention provides a metal oxide varistor with heat protection to mitigate or obviate the aforementioned problems.

SUMMARY OF THE INVENTION

The main objective of the present invention is to provide a metal oxide varistor with heat protection.

The metal oxide varistor with heat protection in accordance with the present invention has a body, an insulated washer, a first lead, a second lead and a thermal fuse. The body has two sides and two contacts respectively on the sides. The insulated washer is attached to one contact and has a through hole. The first lead is mounted on the other contact. The second lead is mounted on the insulated washer. The thermal fuse is mounted on the insulated washer and electrically connects to the second lead and the second contact. When the body overloads and overheats, the thermal fuse causes the circuit to open quickly, and the insulated washer keeps the thermal fuse from electrically connecting to the second contact again.

Other objectives, advantages and novel features of the invention will become more apparent from the following detailed description when taken in conjunction with the accompanying drawings.

BRIEF DESCRIPTION OF THE DRAWINGS

FIG. 12 is a block diagram of a method for fabricating a metal oxide varistor in accordance with the present invention.

DETAILED DESCRIPTION OF THE PREFERRED EMBODIMENTS

With reference to FIGS. 1, 2, 8B, 9, 10 and 12, the present invention comprises a metal oxide varistor and a method of fabricating a metal oxide varistor.

Figure 11:
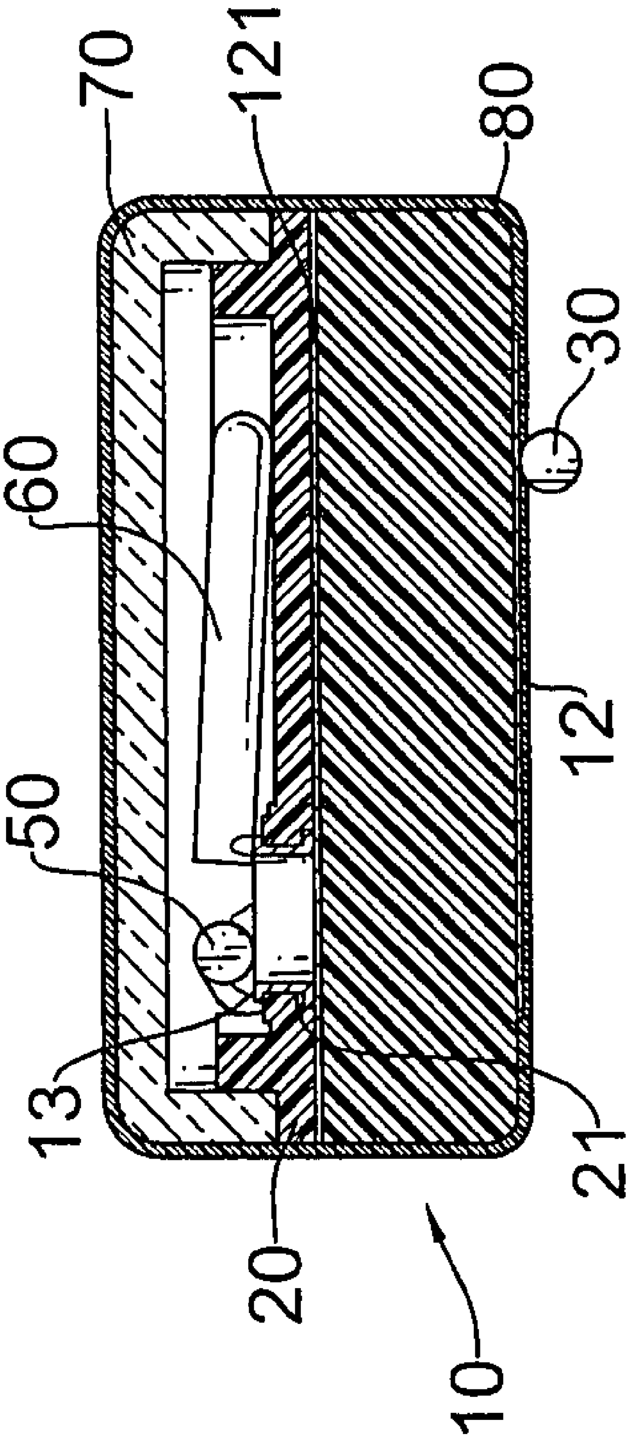
FIG. 11 is a side view in partial section of the metal oxide varistor in FIG. 1 with an encapsulating layer.

With further reference to FIG. 11, the metal oxide varistor comprises a body (10, 10', 10'''), an insulated washer (20, 20', 20'', 20'''), a first lead (30), a second lead (40), an optional test lead (50), a thermal fuse (60), an optional cover (70, 70''') and an optional encapsulating layer (80).

With further reference to FIGS. 3, 4, 7 and 8A, the body (10, 10', 10''') may be circular or rectangular and has a first side, a second side, a first contact (12, 12') and a second contact (121, 121'). The first contact (12, 12') is attached to the first side and may be silver. The second contact (121, 121') is attached to the second side, may be silver and may be sintered on the second side.

Figure 1:
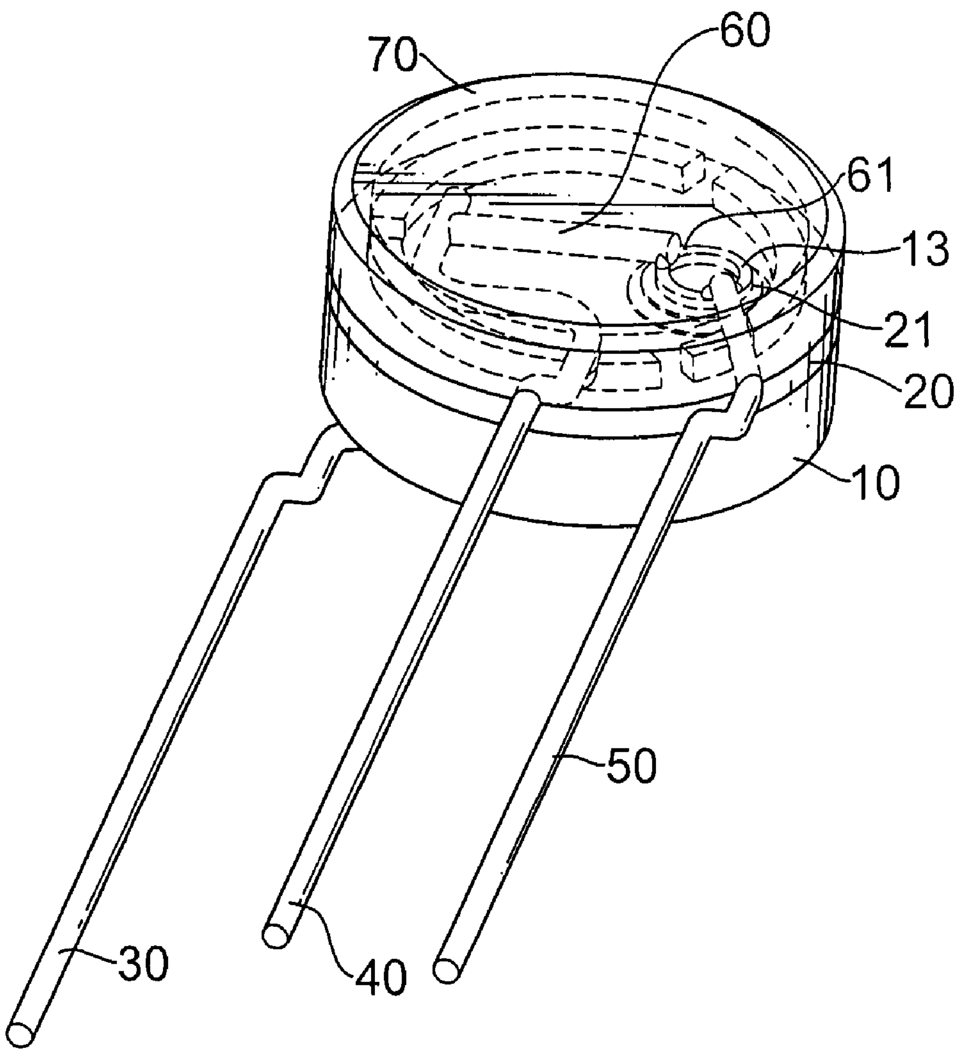
FIG. 1 is a perspective view of a first embodiment of a metal oxide varistor with heat protection in accordance with the present invention.
Figure 2:
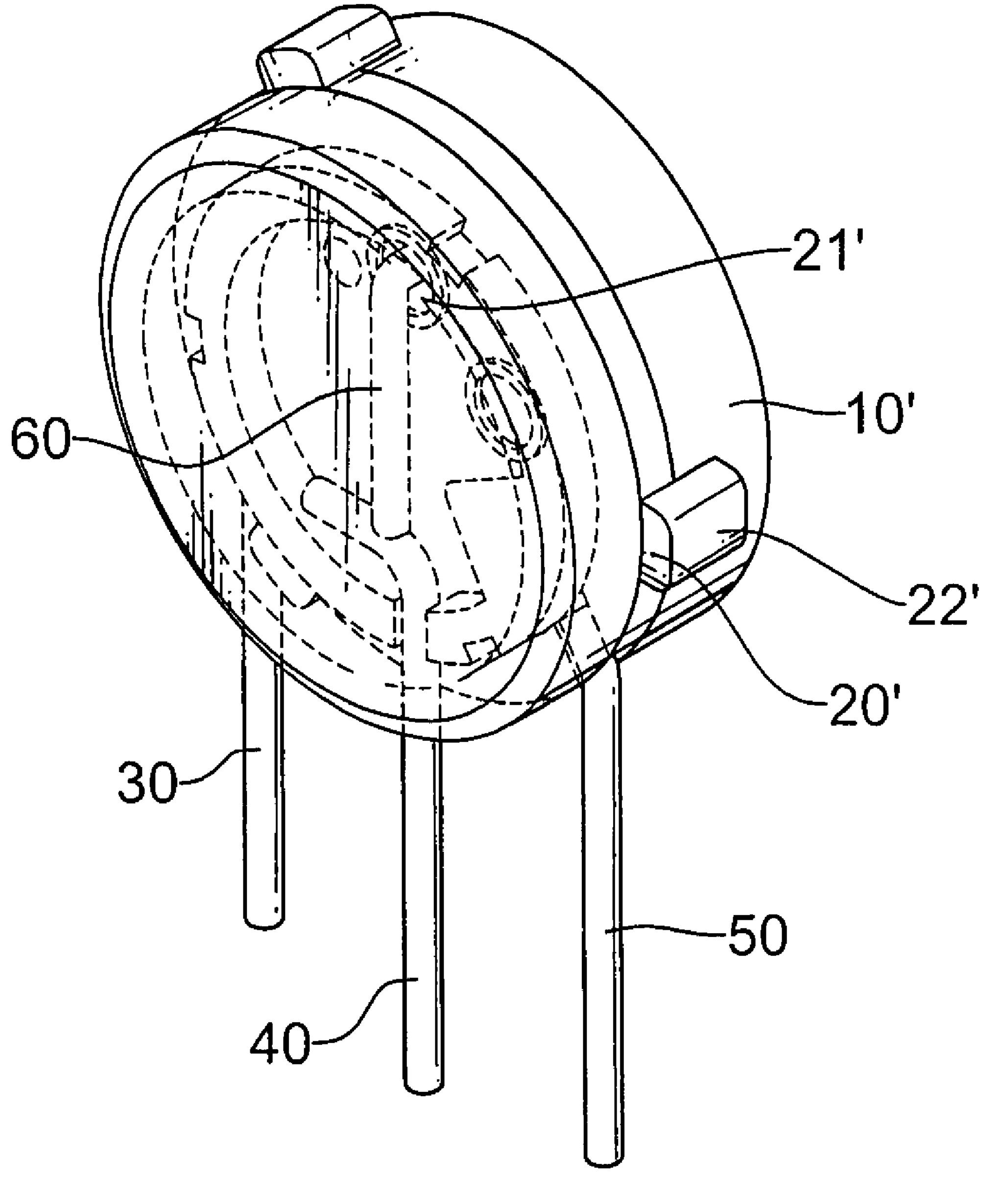
FIG. 2 is a perspective view of a second embodiment of a metal oxide varistor with heat protection in accordance with the present invention.
Figure 3:
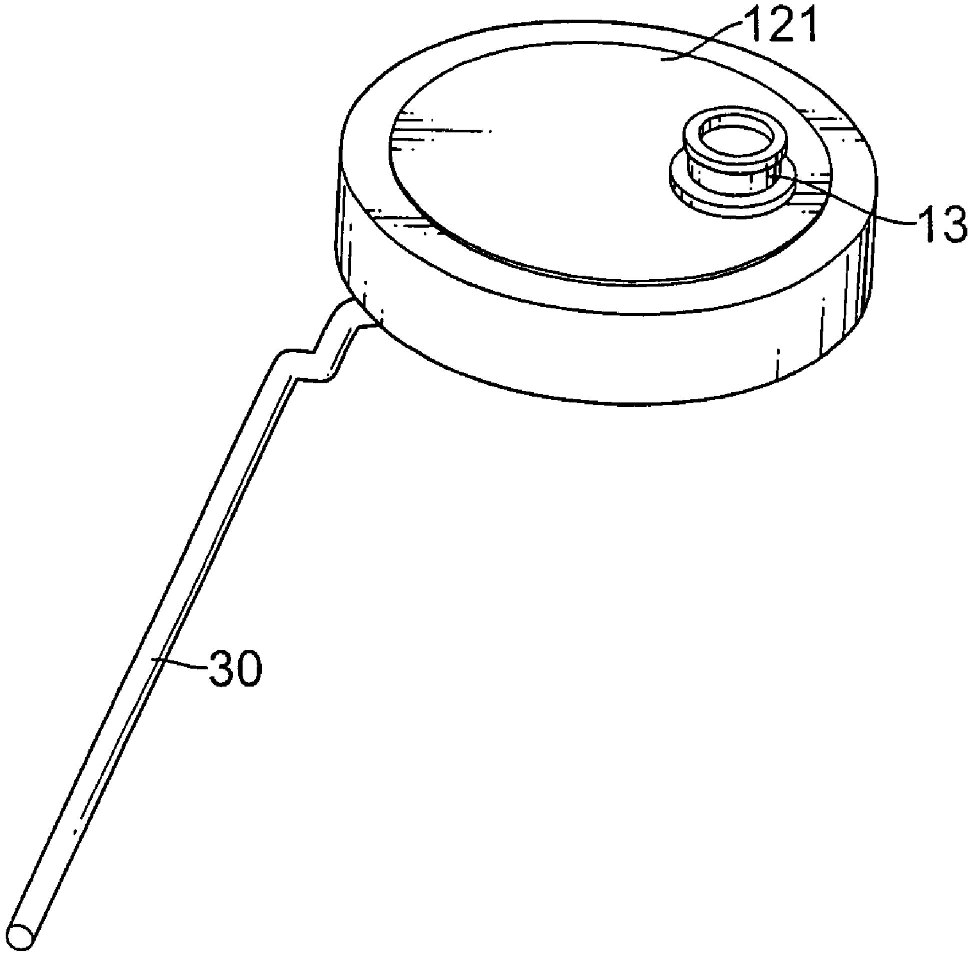
FIG. 3 is a perspective view of a body and first lead of the metal oxide varistor in FIG. 1.
Figure 4:
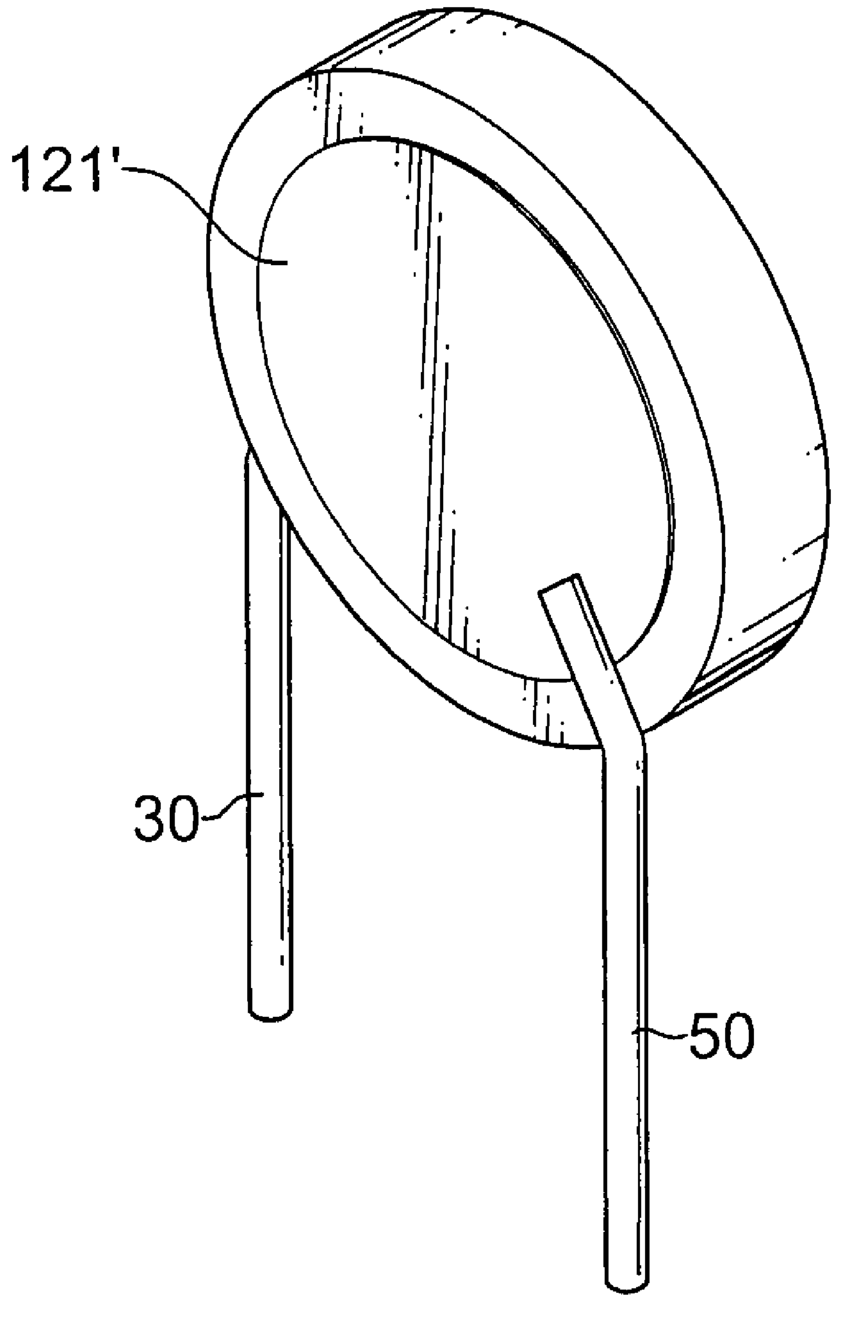
FIG. 4 is a perspective view of the metal oxide varistor in FIG. 2 with a first lead and check lead.
Figure 5:
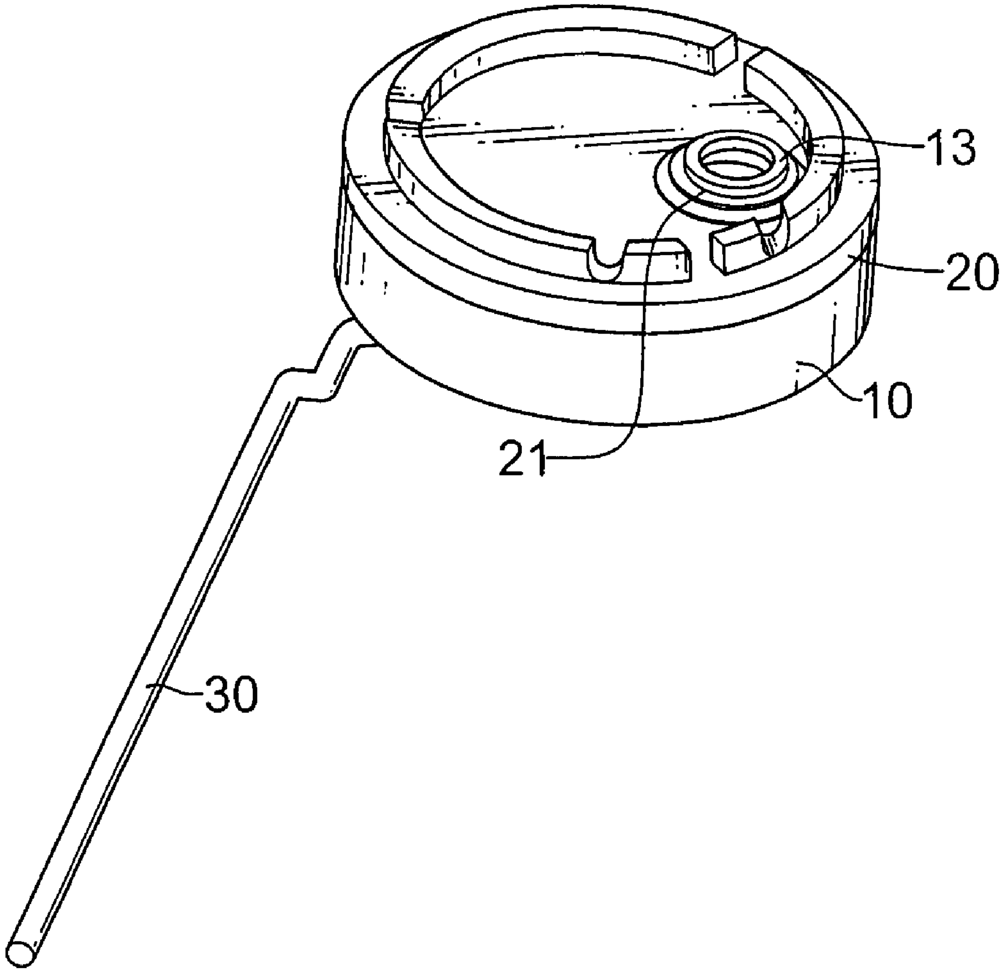
FIG. 5 is a perspective view of the metal oxide varistor in FIG. 3 with an insulated washer.
Figure 6:
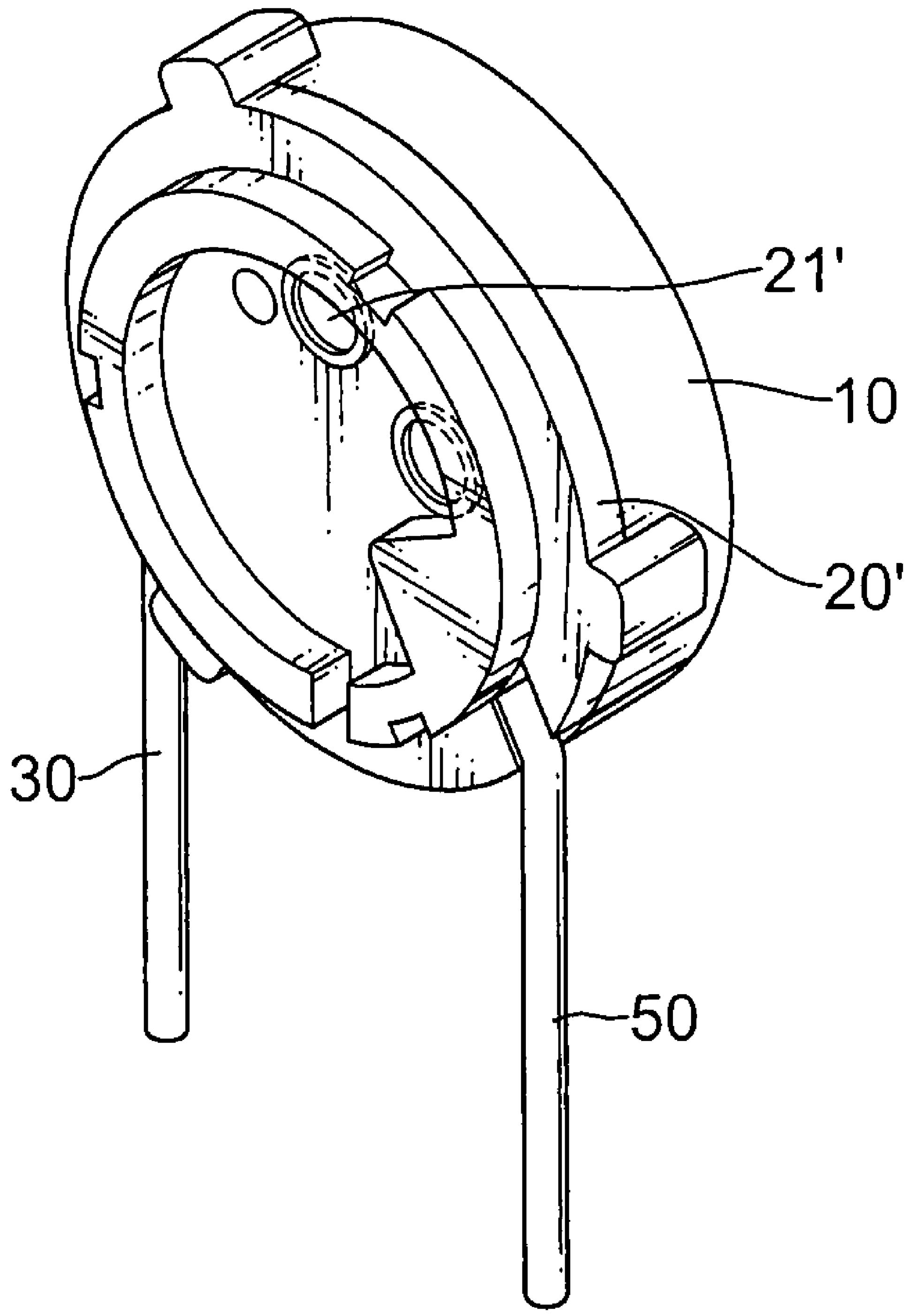
FIG. 6 is a perspective view of the metal oxide varistor in FIG. 4 with an insulated washer.
Figure 7:
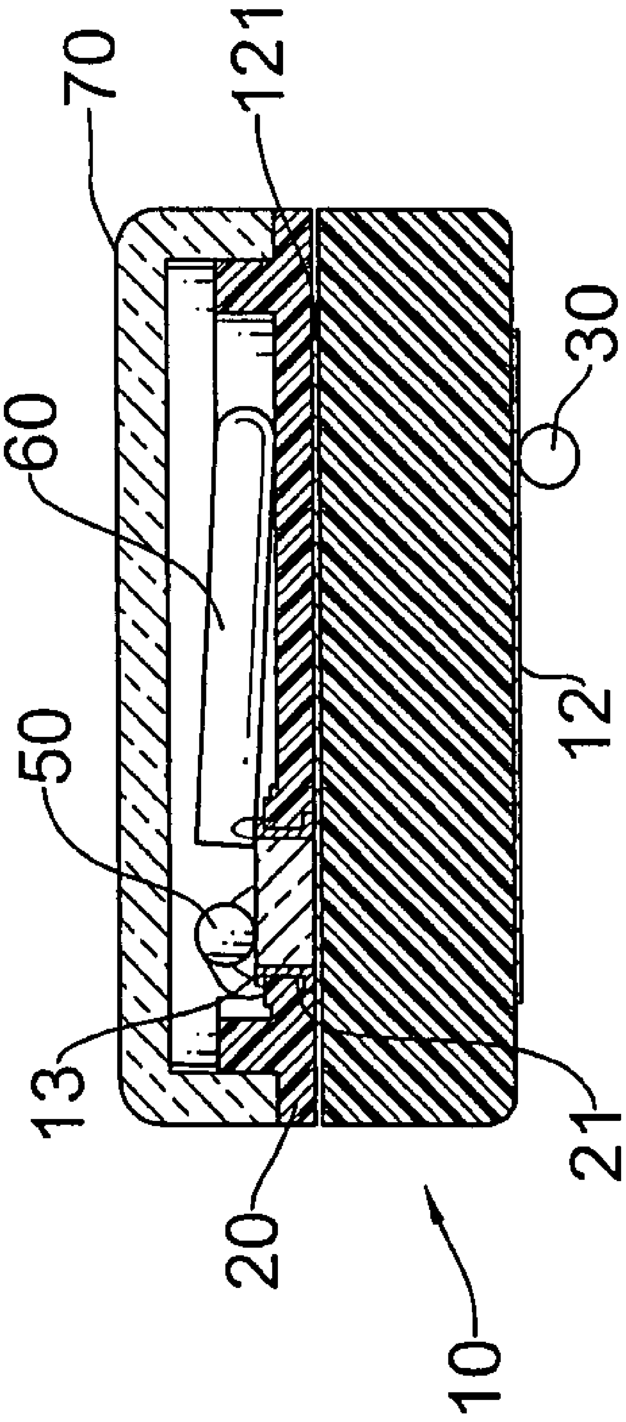
FIG. 7 is a side view in partial section of the metal oxide varistor in FIG. 1.
Figure 8A:
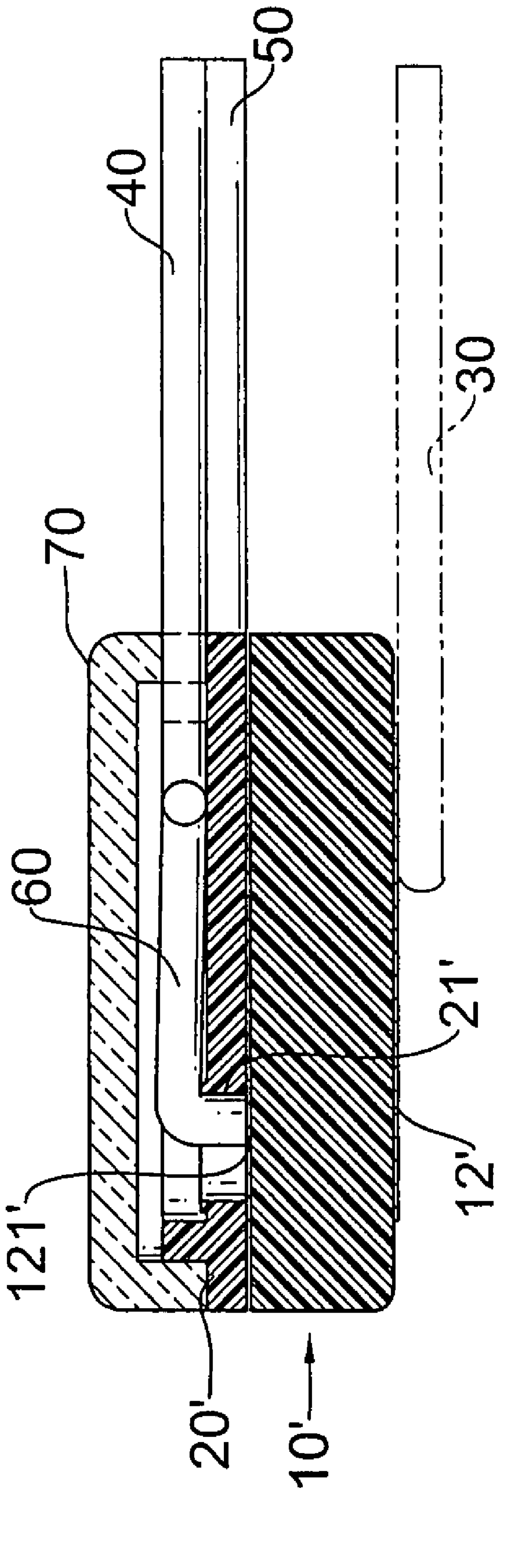
FIG. 8A is a side view in partial section of the metal oxide varistor in FIG. 2.
Figure 8B:
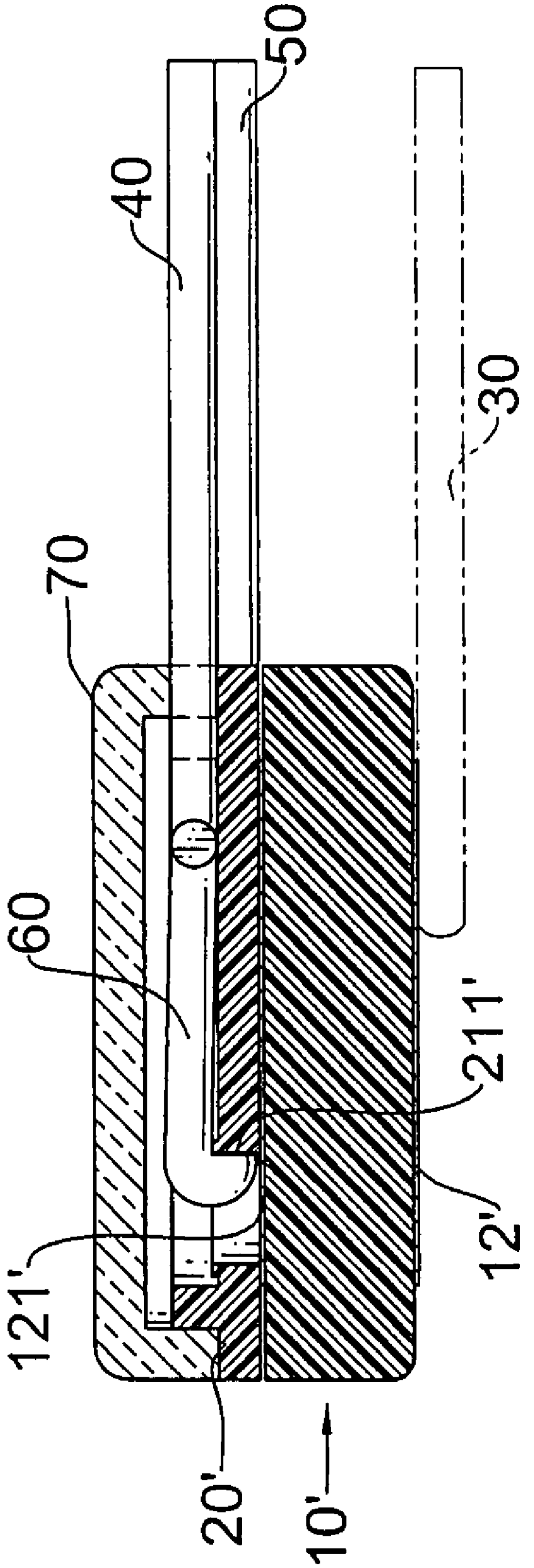
FIG. 8B is a side view in partial section of a third embodiment of a metal oxide varistor with heat protection in accordance with the present invention.
Figure 9:
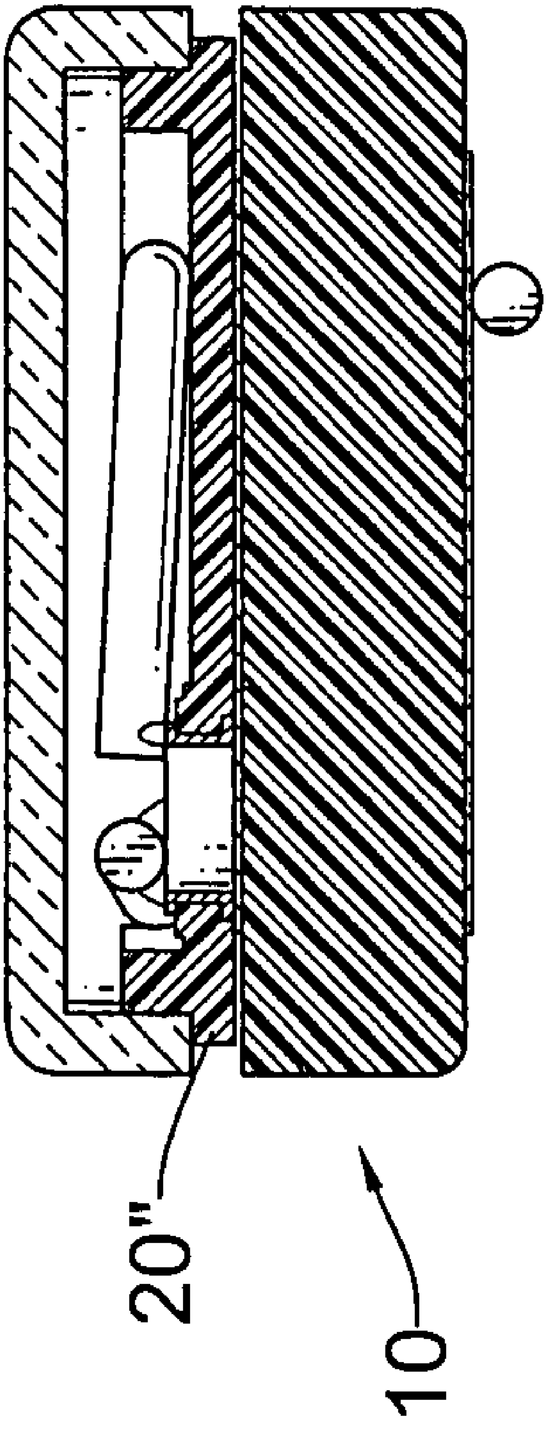
FIG. 9 is a side view in partial section of a fourth embodiment of a metal oxide varistor with heat protection in accordance with the present invention.
Figure 10:
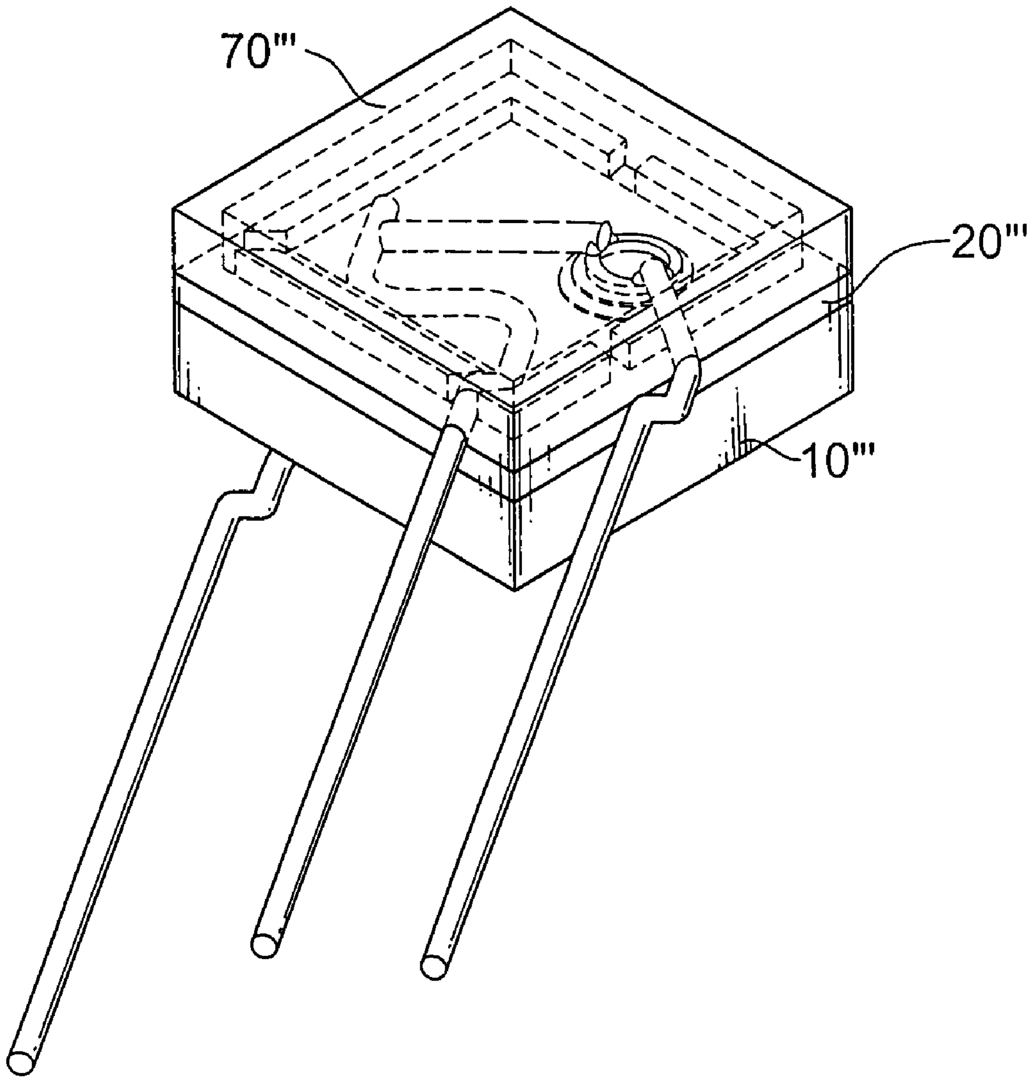
FIG. 10 is a perspective view of a fifth embodiment of a metal oxide varistor with heat protection in accordance with the present invention.

With further reference to FIGS. 5, and 6, the insulated washer (20, 20', 20'', 20''') is attached to the second contact (121, 121'), may be circular or rectangular, may correspond to or be smaller than the body (10, 10'), has a lower surface, an annular edge and a through hole (21, 21') and may have a conductive sleeve (13) or a silver layer (211'). The through hole (21, 21') has an inner wall. The conductive sleeve (13) is mounted securely in the through hole (21) and has a lower end. The lower end of the conductive sleeve (13) is attached securely to the second contact (121, 121') to hold the insulated washer (20) on the second contact (121, 121') and to provide an electrical path. The silver layer (211') is coated on the inner wall of the through hole (21') to provide an electrical path.

The insulated washer (20, 20', 20'', 20''') may be ceramics or polymer and may have a silver sheet or multiple clips (22').

The silver sheet is attached to the lower surface of the insulated washer (20, 20'', 20''') and is sintered on the lower surface of the insulated washer (20, 20'', 20''') so the insulated washer (20, 20'', 20''') can be bonded to the second contact (121, 121'). Because ceramics are excellent heat conductors, the insulated washer (20, 20'', 20''') absorbs heat when the metal oxide varistor overloads and overheats, especially when the insulated washer (20, 20'', 20''') has the silver sheet bonded to the second contact (121, 121').

The polymer is Nylon 66 (PA66), Poly phenylene sulfide (PPS), Liquid Crystal Polymers (LCP) or the like and is somewhat resilient.

The clips (22') are formed on the annular edge of the insulated washer (20') and clamp the insulated washer (20') to the body (10'). Using the clips (22') to secure the insulated washer (20') on the body (10') effectively simplifies assembly of the insulated washer (20') and the body (10').

The first lead (30) is mounted on and electrically connects to the first contact (12, 12').

The second lead (40) is mounted on the insulated washer (20, 20').

The test lead (50) electrically connects to the second contact (12, 12') and may be mounted on the insulated washer (20, 20'', 20''') and be connected to the second contact (12) via the through hole (21) or between the insulated washer (20') and the second contact (121').

The thermal fuse (60) is mounted on the insulated washer (20, 20', 20'', 20''') and has a first end and a second end. The first end of the thermal fuse (60) electrically connects to the second lead (40). The second end of the thermal fuse (60) electrically connects to the second contact (121, 121') via the through hole (21, 21') in the insulated washer (20, 20', 20'', 20'''), may electrically connect to the conductive sleeve (13) at a solder joint (61), may electrically connect to the silver layer (211') in the through hole (21') in the insulated washer (20') or may extend through the through hole (21') in the insulated washer (20') to electrically connect to the second contact (121'). Solder used to form the solder joint (61) has a melting point less than or equal to a melting point of the thermal fuse (60). Because the thermal fuse (60) only electrically connects to the second contact (121, 121') at the second end of the thermal fuse (60), the connection between the thermal fuse (60) and the second contact (121, 121') is easily broken when the thermal fuse (60) overheats and melts. Therefore, when the body (10, 10') overloads and overheats, the thermal fuse (60) causes the circuit to open quickly. Furthermore, when the thermal fuse (60) opens, the insulated washer (20, 20') still transmits heat to the thermal fuse (60) to keep the thermal fuse (60) from electrically connecting to the second contact (121, 121') again.

The cover (70, 70''') corresponds to the body (10, 10', 10'''), and is heat resistant electrical insulation, is mounted above the second side of the body (10, 10', 10''') and the insulated washer (20, 20', 20'', 20''') and has a bottom annular edge and a top inside surface. The heat resistant electrical insulation may be ceramics or polymer so it will not be damaged when the varistor overheats. The bottom annular edge is mounted on the insulated washer (20, 20', 20'', 20'''). The top inside surface is away from the insulated washer (20, 20', 20'', 20''') and forms a sealed cavity between the cover (70, 70''') and the insulated washer (20, 20'). When the thermal fuse (60) overheats and melts, expands the air and causes a spark, the cover (70, 70''') keeps elements of the metal oxide varistor from blowing out of the cover (70, 70'''). Moreover, the sealed cavity between the cover (70, 70''') and the insulated washer (20, 20') absorbs the explosion to reduce noise caused by the explosion.

The encapsulating layer (80) may be epoxy and is coated around the cover (70) and body (10) to resist moisture. Because the encapsulating layer (80) does not contact the thermal fuse (60) directly, the encapsulating layer (80) does not influence the thermal fuse (60) when the encapsulating layer (80) overheats and deforms.

The method of fabricating a metal oxide varistor comprises acts of (1) providing a body (10), (2) providing a ceramic insulated washer (20, 20'', 20'''), (3) sintering a silver sheet on the insulated washer (20, 20'', 20'''), (4) mounting a first lead (30) on a first contact (12) and mounting a second lead (40) on the insulated washer (20, 20'', 20'''), (5) mounting a thermal fuse (60) on the insulated washer (20, 20'', 20''') and (7) applying an encapsulating layer (80).

1. The act of providing a body (10) of the metal oxide varistor provides a body (10) having two sides and a first and a second silver contact (12, 121) attached respectively to the sides.

2. The act of providing a ceramic insulated washer (20) provides an insulated washer (20) being ceramic and having a side, a through hole (21) and a silver sheet attached to the side of the insulated washer (20).

3. The act of sintering a silver sheet on the insulated washer (20, 20'', 20''') and a second contact (121) on the body (10) allows the insulated washer (20, 20'', 20''') to be bonded to the body (10).

4. The act of mounting a first lead (30) on the first contact (12) and mounting a second lead (40) on the insulated washer (20, 20'', 20''') comprises mounting the first lead (30) on the first contact (12), connecting the first lead (30) electrically to the first contact (12) and mounting the second lead (40) on the insulated washer (20, 20'', 20''').

5. The act of mounting a thermal fuse (60) on the insulated washer (20, 20'', 20''') mounts a thermal fuse (60) having a first end electrically connecting to the second lead (40) and a second end electrically connecting to the second contact via the through hole (21) in the insulated washer (20, 20'', 20''').

6. The act of mounting a cover (70) on the body (10) and the insulated washer (20, 20'', 20''') forms a sealed cavity between the cover and the insulated washer (20, 20'', 20''').

7. The act of applying an encapsulating layer (80) around the cover (70) and the body (10) completely covers the cover (70) and the body (10).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A metal oxide varistor with a heat protection comprising:

a body having a first side;

a second side;

a first contact being attached to the first side; and a second contact being attached to the second side;

an insulated washer being attached to the second contact and having a lower surface;

an annular edge; and a through hole having an inner wall;

a first lead being mounted on and electrically connecting to the first contact;

a second lead being mounted on the insulated washer;

a thermal fuse being mounted on the insulated washer and having a first end electrically connecting to the second contact via the through hole in the insulated washer; and a second end electrically connecting to the second contact via the through hole in the insulated washer;

a conductive sleeve mounted securely in the through hole in the insulated washer and having a lower end attached securely to the second contact, and the second end of the thermal fuse electrically connected to the conductive sleeve at a solder joint; and a cover being mounted above the second side of the body and the insulated washer and having a bottom annular edge mounted on the insulated washer; and a top inside surface being away from the insulated washer and forming a sealed cavity between the cover and the insulated washer.

2. The metal oxide varistor as claimed in claim 1, wherein the insulated washer is ceramic.

3. The metal oxide varistor as claimed in claim 1, wherein the insulated washer is polymer.

4. The metal oxide varistor as claimed in claim 1, wherein the second end of the fuse extends through the through hole in the insulated washer to electrically connect the second contact.

5. The metal oxide varistor as claimed in claim 2, wherein the second end of the fuse extends through the through hole in the insulated washer to electrically connect the second contact.

6. The metal oxide varistor as claimed in claim 3, wherein the second end of the fuse extends through the through hole in the insulated washer to electrically connect the second contact.

7. The metal oxide varistor as claimed in claim 1, wherein the insulated washer further comprises a silver layer coated on the inner wall of the through hole in the insulated washer; and the second end of the thermal fuse electrically connects to the silver layer in the through hole in the insulated washer.

8. The metal oxide varistor as claimed in claim 2, wherein the insulated washer further comprises a silver layer coated on the inner wall of the through hole in the insulated washer; and the second end of the thermal fuse electrically connects to the silver layer in the through hole in the insulated washer.

9. The metal oxide varistor as claimed in claim 3, wherein the insulated washer further comprises a silver layer coated on the inner wall of the through hole in the insulated washer; and the second end of the thermal fuse electrically connects to the silver layer in the through hole in the insulated washer.

10. The metal oxide varistor as claimed in claim 6, wherein the insulated washer further has multiple clips formed separately on the annular edge of the insulated washer and clamping the insulated washer to the body.

11. The metal oxide varistor as claimed in claim 3, wherein the insulated washer further has multiple clips formed separately on the annular edge of the insulated washer and clamping the insulated washer to the body.

12. The metal oxide varistor as claimed in claim 9, wherein the insulated washer further has multiple clips formed separately on the annular edge of the insulated washer and clamping the insulated washer to the body.

13. The metal oxide varistor as claimed in claim 1 further comprising an encapsulating layer coated around the cover and body.

14. The metal oxide varistor as claimed in claim 1 further comprising a test lead electrically connecting to the second contact via the through hole in the insulated washer and mounted on the insulated washer.

15. The metal oxide varistor as claimed in claim 1 further comprising a test lead electrically connecting to the second contact and mounted between the insulated washer and the second contact.

* * * * *

UNITED STATES PATENT AND TRADEMARK OFFICE
CERTIFICATE OF CORRECTION

PATENT NO. : 7,741,946 B2
APPLICATION NO. : 11/881047
DATED : June 22, 2010
INVENTOR(S) : Change-Wei Ho It is certified that error appears in the above-identified patent and that said Letters Patent is hereby corrected as shown below:

Title Page

Please change the name of the Assignee at (73) to read:

THINKING ELECTRONIC INDUSTRIAL CO., LTD.

Signed and Sealed this

Twenty-fourth Day of August, 2010

David J. Kappos
*Director of the United States Patent and Trademark Office*